(12) United States Patent
Wu et al.

(10) Patent No.: US 6,370,620 B1
(45) Date of Patent: Apr. 9, 2002

(54) WEB OBJECT CACHING AND APPARATUS FOR PERFORMING THE SAME

(75) Inventors: Kun-Lung Wu, Yorktown Heights; Philip Shi-Lung Yu, Chappaqua, both of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/238,795

(22) Filed: Jan. 28, 1999

Related U.S. Application Data

(60) Provisional application No. 60/111,752, filed on Dec. 10, 1998.

(51) Int. Cl.[7] .................................................. G06F 12/08
(52) U.S. Cl. ..................... 711/132; 711/129; 711/130; 709/215
(58) Field of Search ................................. 711/120, 124, 711/129, 130, 132; 709/213, 214, 215, 216

(56) References Cited

U.S. PATENT DOCUMENTS

| | | | | |
|---|---|---|---|---|
| 5,878,218 A | * | 3/1999 | Maddalozzo, Jr. et al. | . 709/213 |
| 5,893,148 A | * | 4/1999 | Genduso et al. | 711/132 |
| 5,924,116 A | * | 7/1999 | Aggarwal et al. | 711/122 |
| 6,012,126 A | * | 1/2000 | Aggarwal et al. | 711/133 |
| 6,049,853 A | * | 4/2000 | Kingsbury et al. | 711/147 |
| 6,138,210 A | * | 10/2000 | Tremblay et al. | 711/132 |

OTHER PUBLICATIONS

V. Valloppillil et al., "Cache Array Routing Protocol v1.0", Internet Draft, pp. 1–7, Oct. 20, 1997.

G. Goldszmidt et al., "NetDispatcher: A TCP Connection Router", IBM Research Report, RC 20853 p. 1–31, May 19, 1997.

* cited by examiner

*Primary Examiner*—Do Hyun Yoo
*Assistant Examiner*—Gary J. Portka
(74) *Attorney, Agent, or Firm*—F. Chau & Associates, LLP

(57) ABSTRACT

A plurality of web objects are cached. A first object is within an assigned web partition. A second object is outside of the assigned web partition. The first object is placed in a first amount of space within the cache. A copy of the second object is placed in a second amount of space within the cache. The first amount of space includes and is larger than the second amount of space.

21 Claims, 11 Drawing Sheets

WEB OBJECT CACHING AND APPARATUS FOR PERFORMING THE SAME

This application claims the benefit of priority of provisional application Ser. No. 60/111,752 filed Dec. 10, 1998 which is hereby incorporated by reference in its entirety.

FIELD OF THE INVENTION

The present invention relates to web objects, and in particular to the caching of web objects. Specifically, a method and apparatus are disclosed for caching web objects which are both within and outside of an assigned partition.

BACKGROUND OF THE INVENTION

As more and more people are connecting to the World Wide Web through personal computers and other digital appliances, the degradation in response time accessing the Web has become an unpleasant experience for many users. One possible way to improve Web access time is to install a collection of computer servers, such as the Netfinity PC servers offered by IBM, as proxy is servers to the Web. Frequently referenced web objects are cached on these proxy servers. Proxy caching thus allows a large number of clients to quickly access locally-cached web objects. Requests for locally-cached web objects can be serviced by the proxy cache servers rather than a remote originating web server, thus reducing the total traffic to the originating web servers as well as the overall traffic on the Internet.

Due to the exploding growth in the use of the Web, more and more organizations are employing collections of shared web caches, instead of just a single cache, to serve as the proxy server. A collection of shared web caches has many advantages over a single cache in terms of reliability and performance.

A collection of shared web cache servers can be coordinated to aggregate their collective cache capacity so as to maximize their overall caching effectiveness. One such coordination protocol is to use a hash routing protocol, such as the cache array routing protocol, or CARP (V. Valloppillil and K. W. Ross, "Cache Array Routing Protocol v1.0," Internet Draft, http://ircache.nlanr.net/Cache/ICP/draft-vinod-carp-v1-03.txt, February 1998). CARP is an emerging Internet standard protocol. In a hash routing protocol, such as CARP, the URL (uniform resource locator) space is partitioned among is the shared cache servers. Each partition is then assigned to a cache server. A cache server is then responsible for caching and maintaining the objects belonging to the assigned partition. Usually a hash function is applied, either by the client browsers or the cache servers, to a key associated with a request for a web object, such as the URL or target IP address, to find a partition corresponding to that URL or target IP address. The request for the web object is then sent to the cache server associated with the correct partition. In the case of server-executed hashing, client requests sent to a cache server for objects that belong to a non-assigned partition will be forwarded to the cache server associated with the assigned partition. Duplication of cache contents is eliminated and traffic between the collection of cache servers and the originating web servers is thus minimized.

Without some replication of web objects among the several web cache servers, however, multiple requests for the same objects will be repeatedly forwarded to the same assigned cache server by the other cache servers. Such repeatedly-forwarded requests impose additional CPU processing load on the assigned-partition server and generate additional traffic among the cache servers. As a result, client response times will be degraded.

SUMMARY OF THE INVENTION

A plurality of web objects are cached, A first object is within an assigned web partition, A second object is outside of the assigned web partition. The first object is placed in a first amount of space within the cache. The second object is placed in a second amount of space within the cache. The first amount of space includes and is larger than the second amount of space.

DETAILED DESCRIPTION OF THE INVENTION

Figure 1:
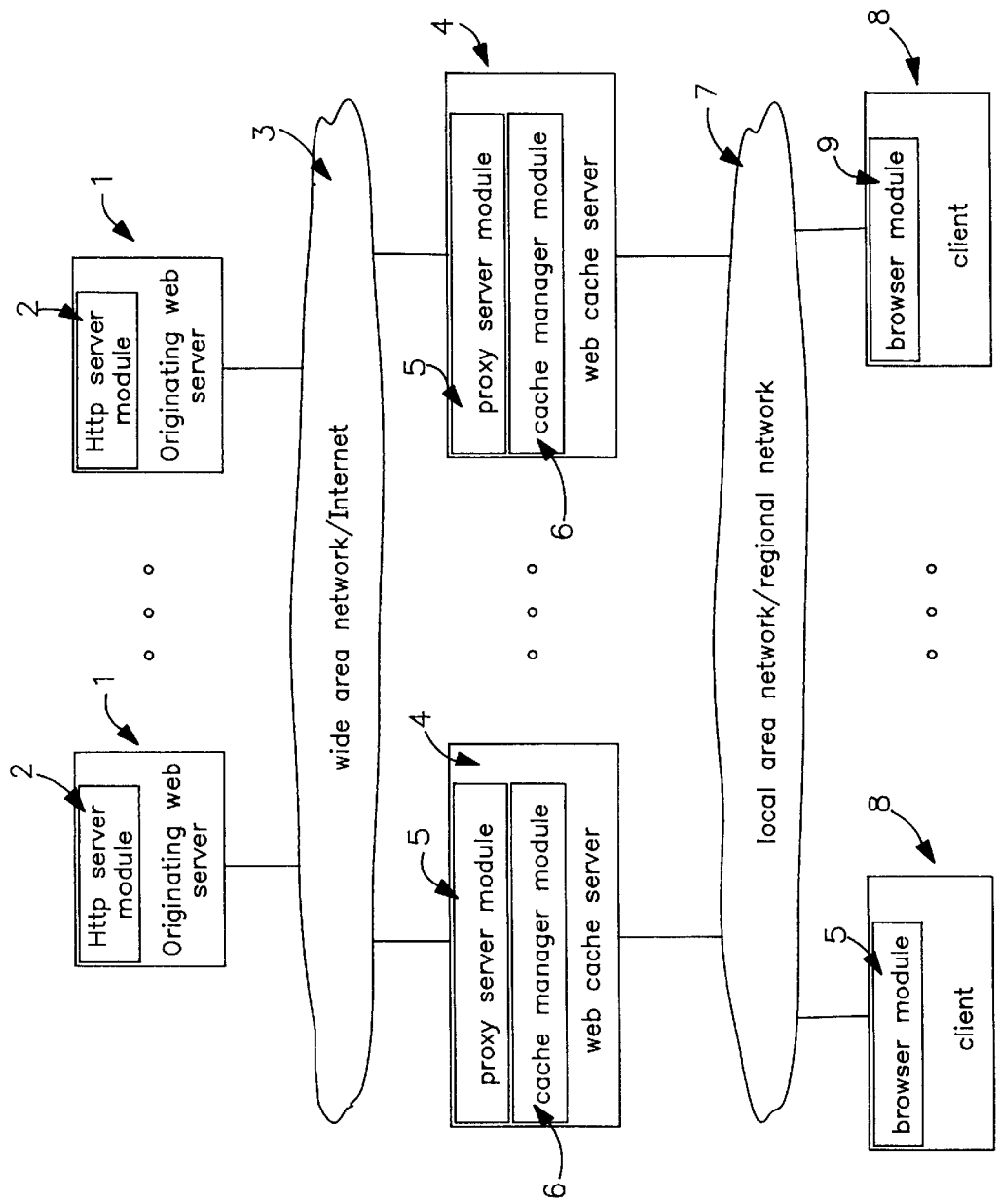
FIG. 1 is a block diagram of a system of shared web caches employing an exemplary embodiment of the present invention.

FIG. 1 is a block diagram of a system that uses a collection of loosely-coupled shared web cache servers 4 to allow a plurality of clients 8 to quickly access web objects. Frequently accessed web objects are stored in the cache servers 4. Each client 8 is configured to connect to one of the cache servers 4 through a local area network or a regional area network 7. The shared web cache servers 4 are connected with each other through a local area network or a regional area network 7. These shared web cache servers act like siblings in that no hierarchical order exists among them. Each client 8 employs a browser software module 9 to access web objects. Each web cache server 4 employs a proxy server module 5 and a cache manager module 6 to perform the web proxy caching function. The proposed controlled caching of non-assigned-partition objects is implemented in the cache manager module 6. Finally, each web cache server can be connected to any originating web server 1 through a wide area network or the Internet 3. The originating web server contains a HTTP server module 2 to respond to requests forwarded from a web cache server 4 due to a cache miss.

A hash routing scheme with local replication is used to coordinate the caching of web objects in the shared web caches 4 in FIG. 1. Here, a given web cache server 4 may also cache non-assigned-partition objects. The non-assigned-partition objects in a cache represent locally-replicated objects. As a result, there are two types of objects in each cache on each web cache server 4. A first type belongs to the partition assigned to the given web cache server 4 and the other type belongs to one of the partitions not assigned to the given web cache server 4. It can be determined whether an object is an assigned partition object or a non-assigned partition based upon the ID of the object. Separate cache management policies are used to manage these two different types of objects.

Figure 2:
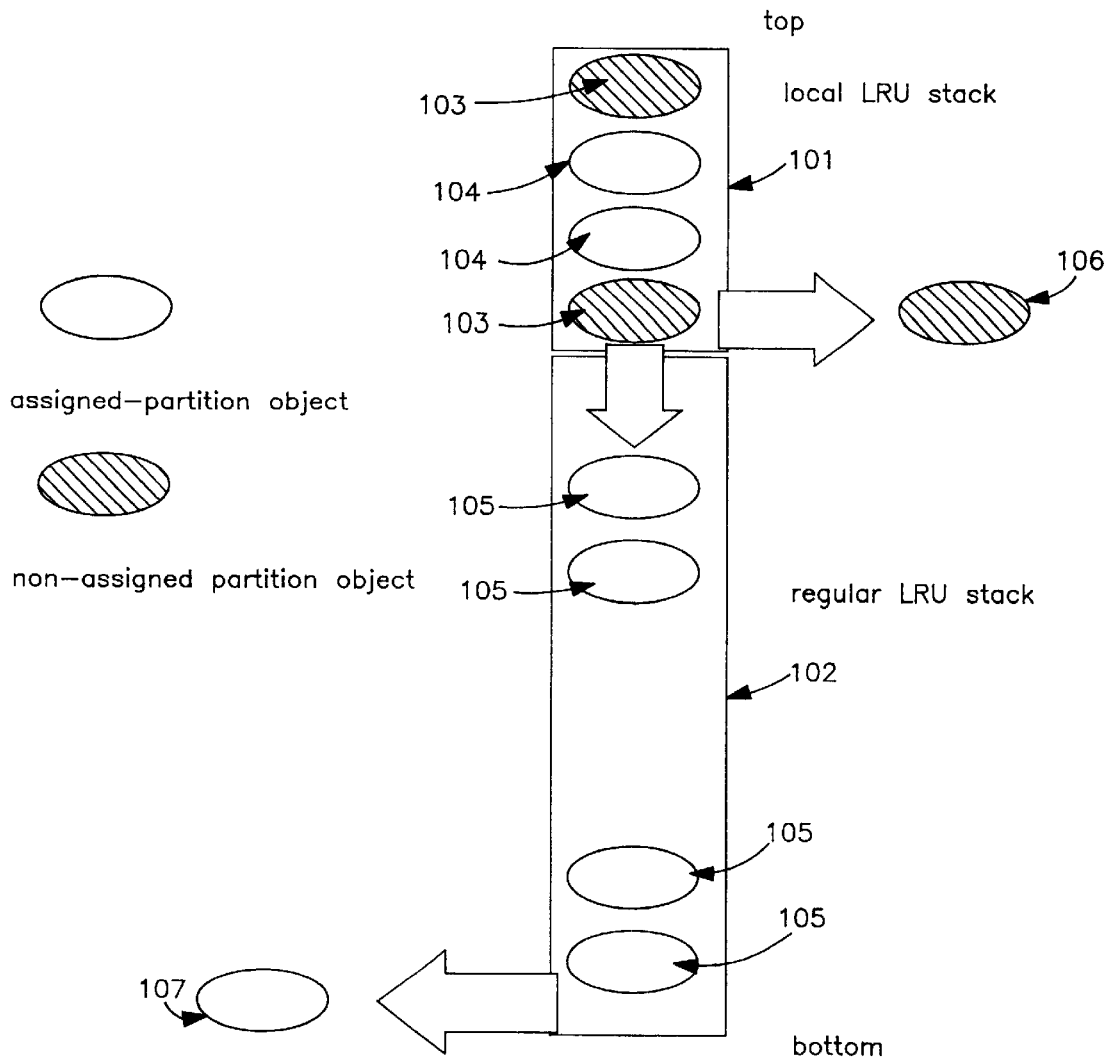
FIG. 2 is a diagram illustrating the movements of assigned-partition objects and non-assigned-partition objects in a cache constructed in accordance with an exemplary embodiment of the present invention.

FIG. 2 shows the diagram of object movements in a cache with two different kinds of objects: assigned-partition objects 104 and 105 and non-assigned-partition objects 103. Two LRU (least recently used) stacks are used, a local LRU stack 101 and a regular LRU stack 102. The aggregate of the two LRU stacks 101 and 102 is the total cache size. Thus, the size of the local LRU stack 101 determines the maximum amount of local replication for non-assigned-partition objects in each web cache server 4.

Without controlled caching of non-assigned-partition objects 103, most of the cache space in a given web cache server 4 may be occupied by such objects, leaving little space for the assigned-partition objects 104. To further reduce the space impact of the non-assigned-partition objects 103, both types of objects 103 and 104 can be cached in the local LRU stack (or "stack") 101. However, only assigned-partition objects 105 can be cached in the regular LRU stack (or "further stack") 102. Stack 101 and further stack 102 together define a first amount of space. Stack 101, by itself, defines a second amount of space. Thus, the first amount of space includes and is larger than the second amount of space. If a requested object can be found in either LRU stack 101 or 102, it is moved to the top of the corresponding stack 101 or 102. For a new object to be cached, it is pushed onto the top of the local LRU stack 101, As a result of the newly pushed object, objects at the bottom of the local LRU stack 101 may have to be pushed out. If the pushed-out objects belong to a non-assigned partition, then they are simply discarded, as shown with object 106 in FIG. 2. If the pushed-out objects belong to the partition assigned to the given web cache server 4, they are pushed onto the top of the regular LRU 102. This way, the locally-replicated non-assigned-partition objects 103 can stay in a cache only if they are frequently referenced and thus remain resident in the local LRU stack 101. One can control the size of the local LRU stack 101 to determine the amount of local replication of non-assigned partition objects 103 for each cache server 4.

The cache manager module 6 in FIG. 1 can be described mainly by two important functions: lookup and caching. The lookup function is called to check if a requested object exists in the cache maintained aboard a given web cache server 4. The caching function, on the other hand, describes the steps for storing a copy of an object in the cache, including the replacement algorithm if free space is not available in the cache.

Figure 3:
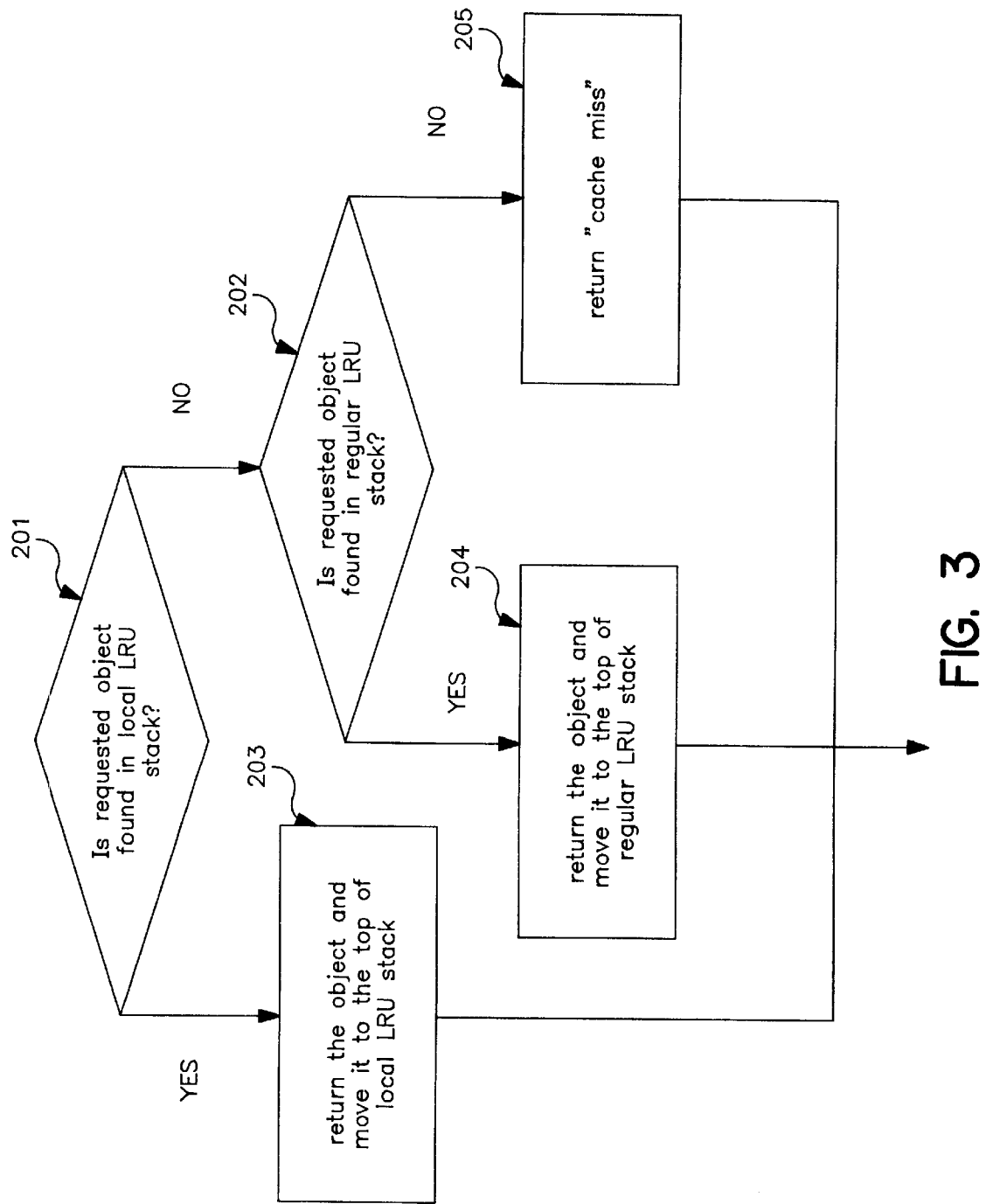
FIG. 3 is a flow chart of an exemplary lookup function used by the cache manager module.

FIG. 3 shows the flow diagram of the lookup function of the cache manager module 6 in FIG. 1. In block 201, a requested object is first searched in the local LRU stack 101 in FIG. 2. If the requested object is found in the local LRU stack 101, then it is returned and the object is moved up to the top of the local LRU stack 101, as shown in block 203. If not found, block 202, then the object is searched in the regular LRU stack 102. If found in the regular LRU stack 102, then it is returned and the object is moved up to the top of the regular LRU stack 102, as shown in block 204. If the requested object cannot be found in the regular LRU stack 102, then the look up function returns "cache miss", as shown in block 205.

Figure 4:
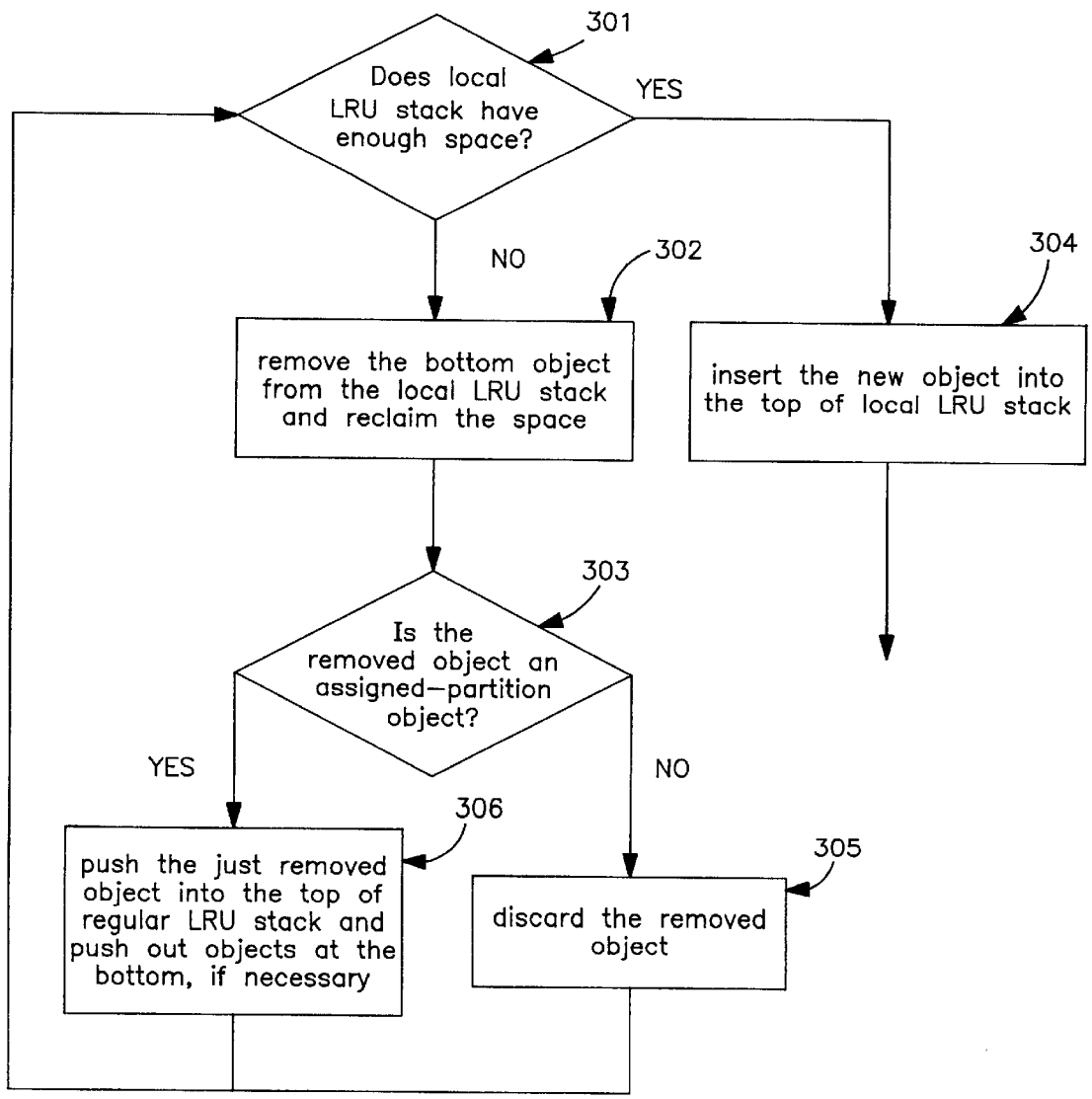
FIG. 4 is a flow chart of an exemplary caching function used by the cache manager module.

FIG. 4 shows the flow diagram of the caching function of the cache manager module 6. In block 301, the local LRU stack 101 is first checked to see if there is enough space for caching the new object. If yes, block 304, the new object is inserted into the top of the local LRU stack 101. If not, block 302, the bottom object from the local LRU stack 101 is removed and its space is reclaimed. The removed object is then examined to see if it is an assigned-partition object 104, as shown in block 303. If yes, block 306, then a copy of the just removed object is pushed onto the top of the regular LRU stack 102 and the objects at the bottom of the regular LRU stack 102 may be pushed out, if necessary, for needed space. If not, block 305, then the removed object from the bottom of the local LRU stack 101 is simply discarded. The removing of objects from the bottom of the local LRU stack 101, as shown in blocks 302, 303, 305 and 306, continues until there is enough space for the new object to be cached in the local LRU stack 101.

Using the lookup function described in FIG. 3 and the caching function described in FIG. 4, a non-assigned-partition object 103 can only stay in the cache if it is referenced frequently. If the non-assigned-partition object 103 is not referenced sufficiently frequently, it is going to be discarded and replaced by either another non-assigned-partition object 103 or an assigned-partition object 104. As a result, the caching of non-assigned-partition objects 103 is controlled by the above-described cache management policy. If the size of the local LRU stack 101 is limited, then the space impact to the assigned-partition objects 104 is also limited. However, significant benefits can be achieved in terms of reduced inter-cache requests even if there is only limited amount of local replication of non-assigned-partition objects 103. This is especially true if the locally-replicated non-assigned-partition objects 103 exhibit high reference locality. Namely, these objects are referenced continuously and frequently.

The proxy server module 5 in FIG. 1 can execute a hash routing protocol to cooperatively process a request sent to any one of the shared web cache servers 4. This hash routing protocol is described in connection with FIG. 5 and FIG. 6.

Figure 5:
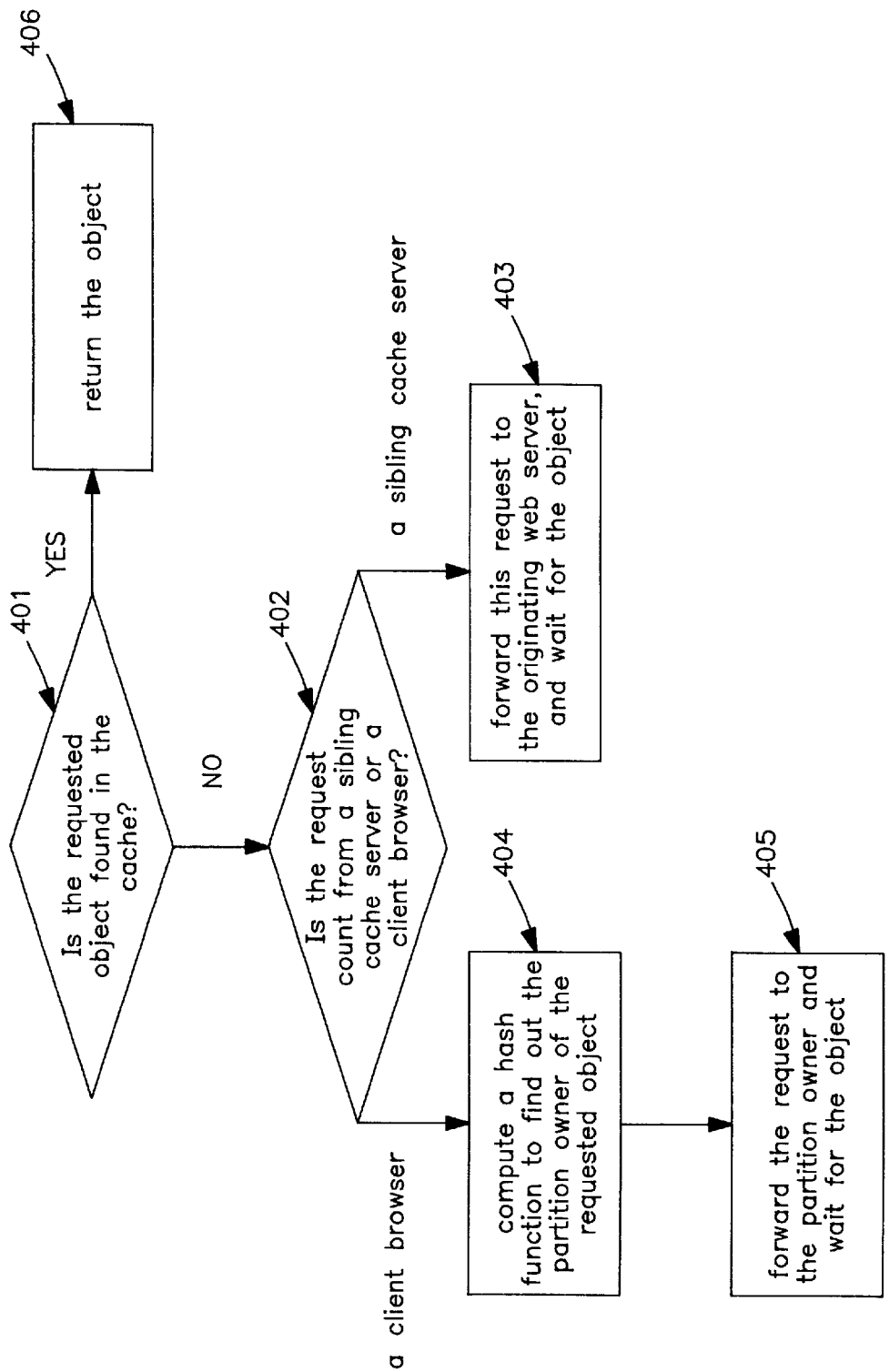
FIG. 5 is a flow chart of exemplary steps taken by a cache server when a request for an object is received.

FIG. 5 shows the flow diagram of steps taken by a web cache server 4 when it receives a request for an object. In block 401, the web cache server 4 first checks to see if the requested object can be found in its cache by calling the lookup function described in FIG. 3. If yes, block 406, the object is returned. If not, block 402, it checks to see if the request is coming from a sibling web cache server (another web cache server 4) or a client 8. If the request is from a sibling web cache server 4, block 403, then the web cache server 4 forwards the request to an originating web server 1 and waits for the object. If the request is from browser software 9 on client 8, block 404, then a hash function is computed based on a key, such as the requested URL address or the requested IP address, to identify the partition owner of the requested object. Web cache server 4 then forwards the request to the identified partition owner and waits for the object, as shown in block 405.

Figure 6:
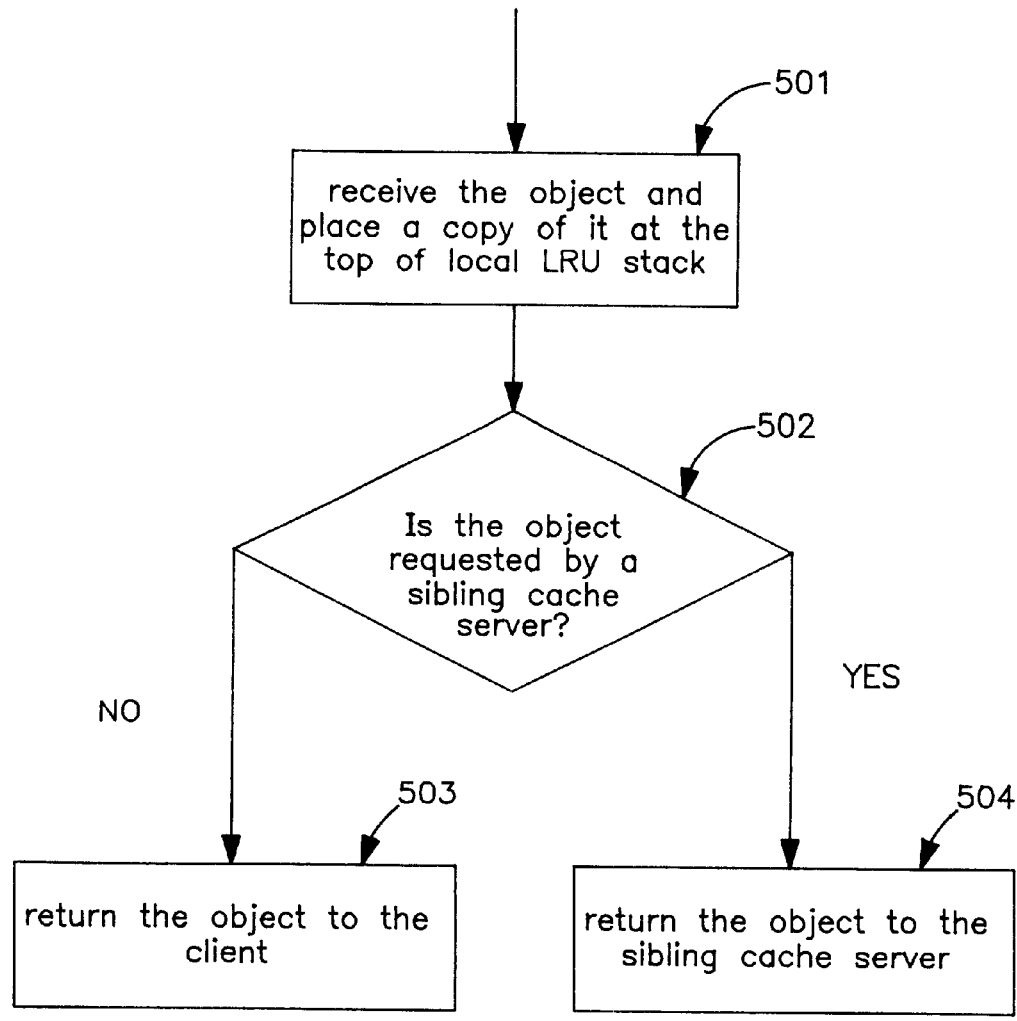
FIG. 6 is a flow chart of exemplary steps taken by a cache server when an object is received.

FIG. 6 shows the flow diagram of steps taken by a web cache server 4 when an object is received, such as from an originating web server 1. In block 501, a copy of the object is cached at the top of the local LRU stack 101 following the procedures described in FIG. 4. Then the web cache server 4 checks to see if the object was requested by a sibling web cache server 4, as is shown in block 502. If yes, block 504, a copy of the object is returned to the sibling web cache server 4. If not, block 503, then the object must have been requested by a browser module 9 on a client 8, and a copy of the object is returned to the requesting client 8.

For performance reasons, a new web cache server 4 can be added to the collection of shared web servers. On the other hand, if one of the web cache servers 4 fails, it can be deleted from the collection. The addition/deletion of a web cache server 4 to/from the collection of shared web caches can result in a change of partition assignment. Such changes in partition assignment necessitate special actions because some of the original assigned-partition objects 104 can become non-assigned-partition objects 103, and vice versa.

Figure 7:
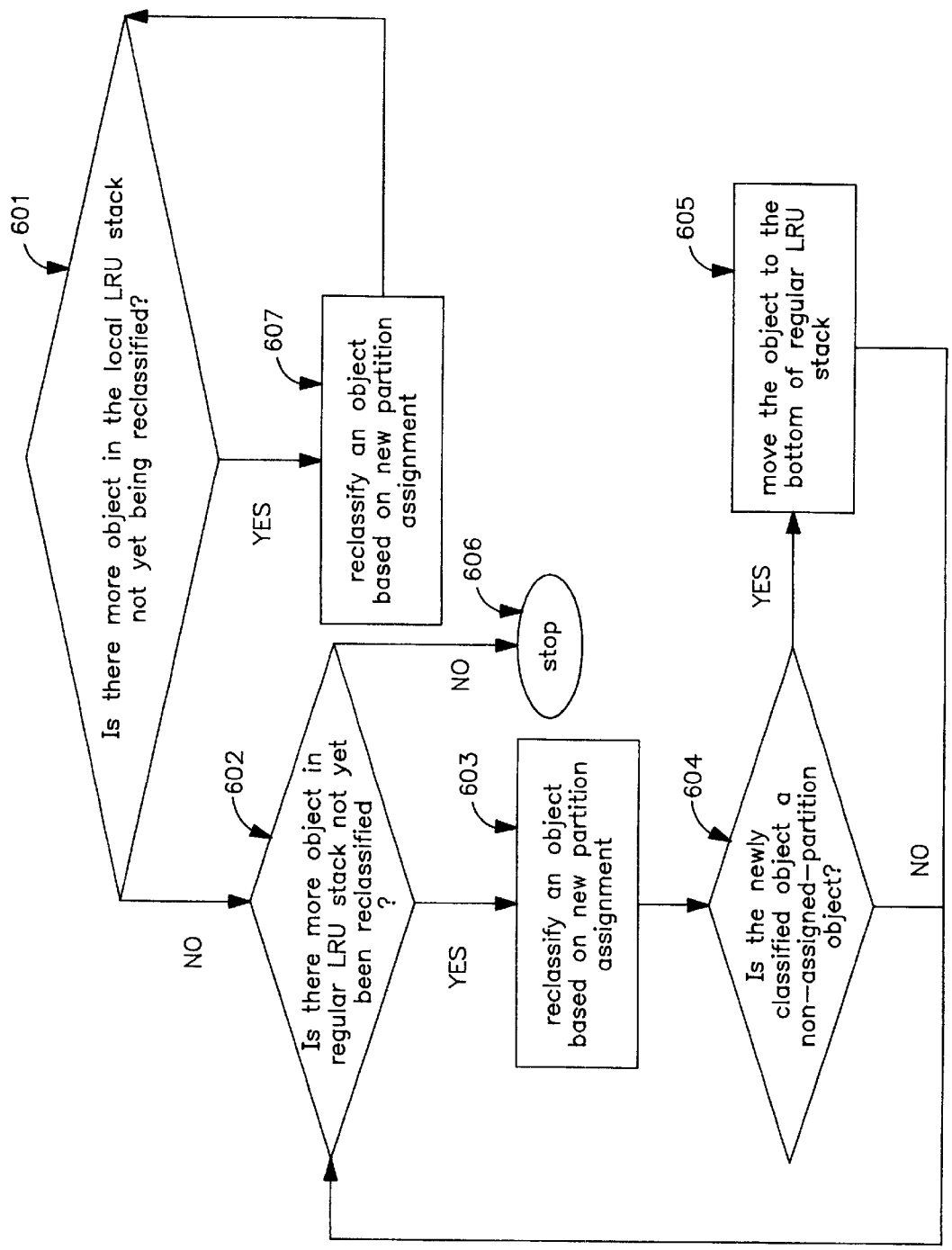
FIG. 7 is a flow chart of exemplary steps taken by a cache server when the partition assignment is changed.

FIG. 7 shows the flow diagram of steps taken by a web cache server 4 when the partition assignment is changed. In block 601, the web cache server 4 checks to see if there is any more objects in the local LRU stack 101 that need to be reclassified according to the new partition assignment. If yes, block 607, it reclassifies the object and loops back to block 601 until there are no more objects in the local LRU stack 101 that need to be reclassified. Then, block 602, the web cache server 4 checks to see if there are any more objects in the regular LRU stack 102 that need to be reclassified. If yes, block 603, it reclassifies the object based on the new partition assignment. After reclassification of an object in the regular LRU stack 102, the web cache server 4 further checks to see if the newly-reclassified object belongs to a non-assigned-partition, block 604. If yes, block 605, then the newly-reclassified non-assigned-partition object 103 is moved to the bottom of the regular LRU stack 102.

The reclassification steps for objects in the regular LRU stack 102, including blocks 602, 603, 604, and 605, stop when there are no more objects in the regular LRU stack 102 that need reclassification.

Note that in FIG. 7, the newly-reclassified non-assigned-partition objects 103 in the local LRU stack 101 need not be moved to the bottom of the stack. This is because the local LRU stack 101 can hold both assigned-partition and non-assigned-partition objects 104 and 103 while the regular LRU stack 102 is designed to hold only assigned-partition objects 104. By moving the newly-reclassified non-assigned-partition objects 103 to the bottom of the regular LRU stack 102, these objects will be quickly replaced by other new assigned-partition objects 104.

So far, the hash function is assumed to be executed only by the proxy server module 5. In practice, the client browser module 9 can execute the hash function and send its request to the proper web cache server 4 hosting the assigned partition. In a browser-executed hash routing protocol, a web cache server 4 would simply fetch the requested objects from the originating web server 1 if they are not found in the cache. However, under uneven reference patterns to web objects, some of the web cache servers 4 may experience an overloaded condition and it may be preferable to redirect some requests to a sibling web cache server 4. In this case, the overloaded web cache server 4 would respond to the client browser 9 with an HTTP redirect message along with a suggested sibling web cache server 4 to which the request will be redirected. The client browser 9 then redirects the request and any subsequent request to the suggested sibling web cache server 4. The sibling web cache server 4 can thus employ the controlled caching of non-assigned-partition objects 103 described in FIGS. 3 and 4 to manage objects received as a result of such redirected requests.

Figure 8:
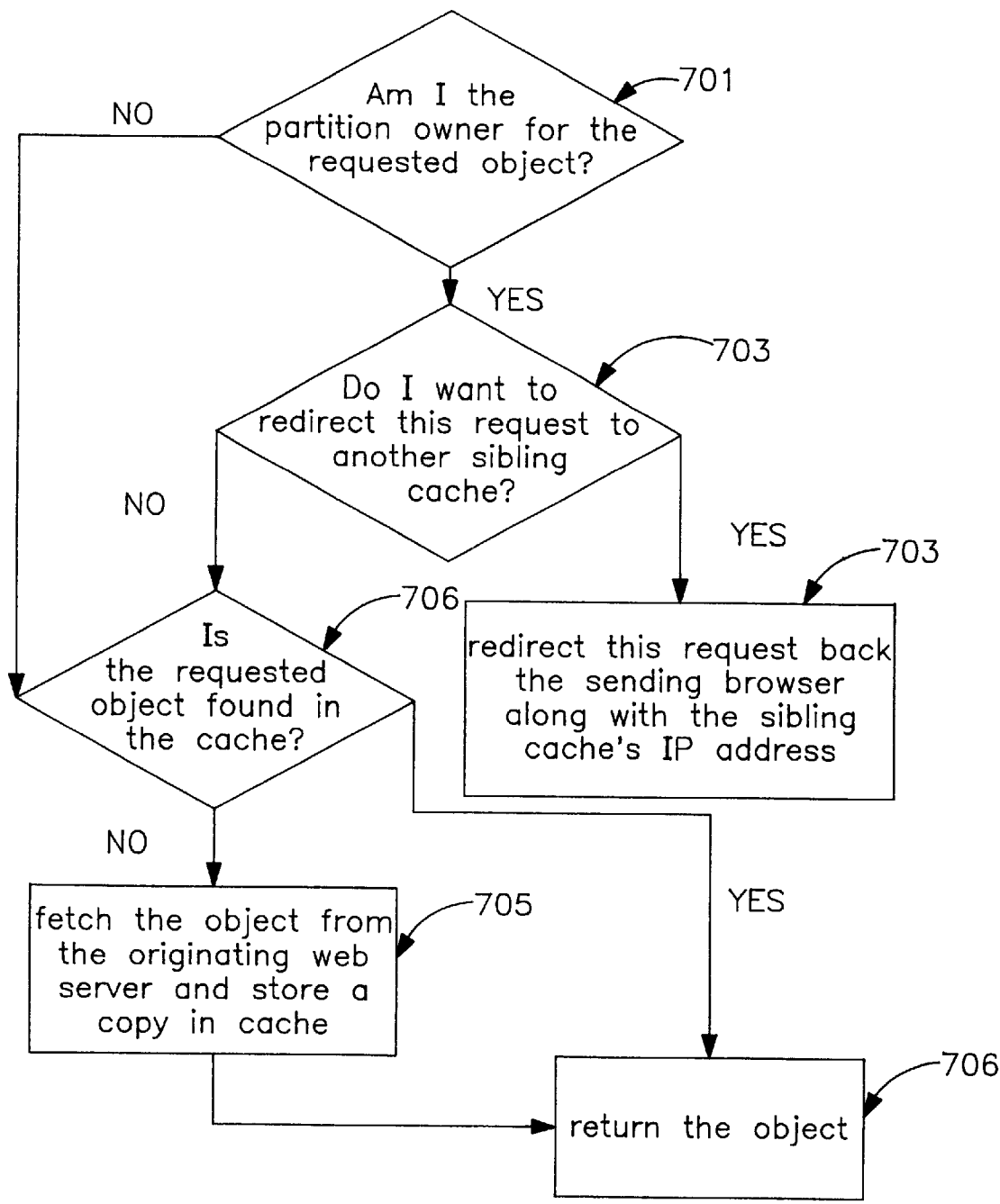
FIG. 8 is a flow chart of exemplary actions taken by a cache server in a browser-executed hash routing protocol.

FIG. 8 shows the flow diagram of actions taken by a web cache server 4 in a browser-executed hash routing protocol. Upon receiving a request from a client browser 9, block 701, the web cache server 4 first checks to see of it is the partition owner of the requested object. If yes, block 702, it decides whether or not it wants to redirect this request to another sibling web cache server 4. One possible condition causing redirection may be CPU overload. However, those of ordinary skill in the art will appreciate that other conditions may cause a given web cache server 4 to re-direct requests to a sibling web cache server 4. Once it decides to redirect the request, block 703, the web cache server 4 sends the request back to the browser 9 along with an IP address corresponding to the suggested sibling web cache server 4. The browser 9 will redirect its requests to the suggested sibling web cache server 9. Hence, if a web cache server 9 is not the partition owner of a requested object, the request for that object is not redirected. In such a case and if a web cache server 4 decides not to redirect, block 704, the web cache server 4 checks if the requested object can be found in its cache, using the lookup function described in FIG. 3. If yes, block 706, the object is returned to the requesting browser 0. If not, block 705, the object is fetched from the originating web server 1 and a copy of it is stored in the cache using the function described in FIG. 4.

Figure 9:
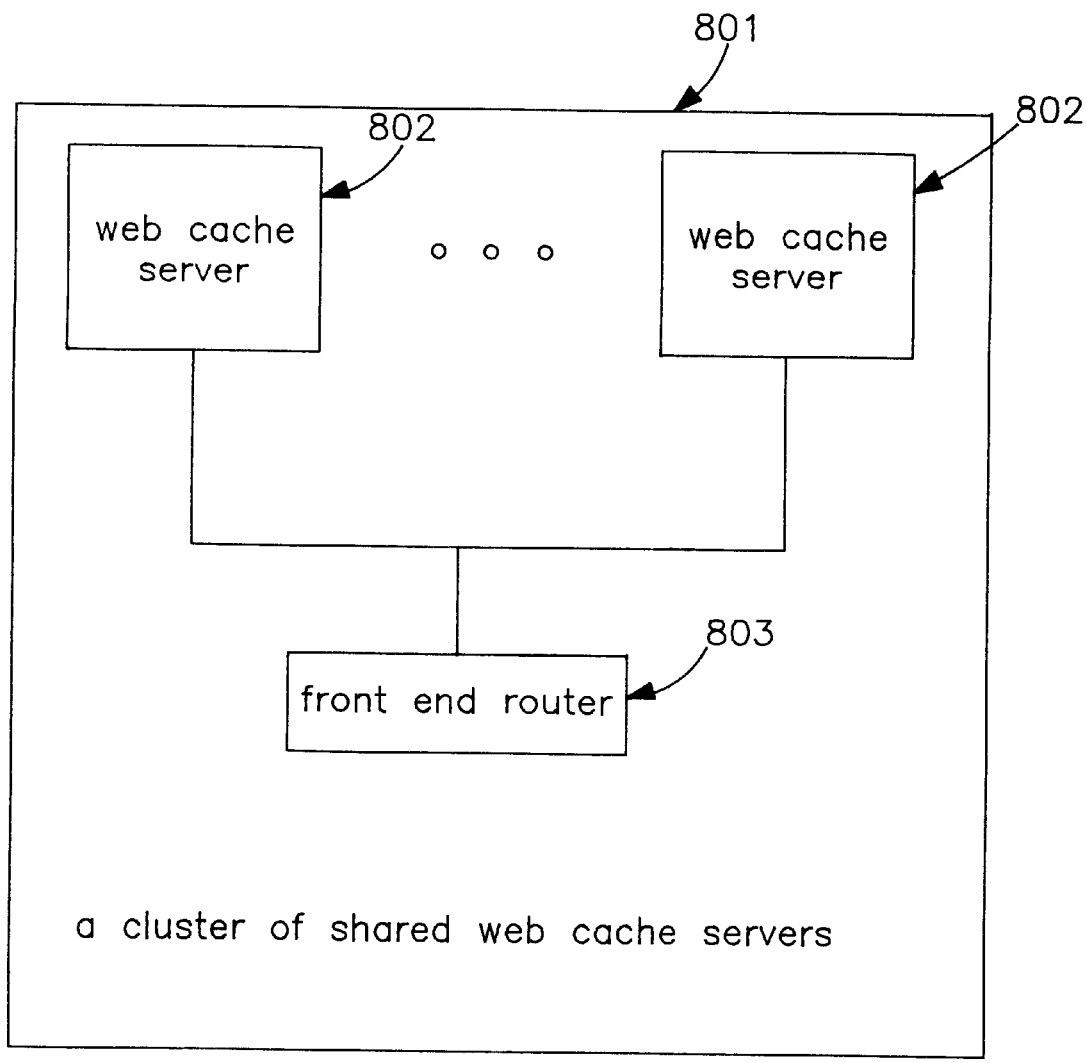
FIG. 9 is a block diagram of a cluster of web cache servers constructed in accordance with one exemplary aspect of the invention.

Controlled caching of non-assigned-partition objects 103 also can be employed by web cache servers 802 within a cluster 801. FIG. 9 shows a block diagram of a cluster 801 of web cache servers 802. Each cluster 801 consists of a front-end router 803, and a plurality of web cache servers 802. An example of such a cluster 801 of cache servers 802 is the IBM NetDispatcher. (G. Goldszmidt and G. Hunt, "NetDispatcher: A TCP Connection Router," IBM Research Report, RC 20853, May 1997.) A hash routing protocol can be applied among a collection of clusters. Each cluster 801 is assigned a partition. In such a clustered system, a browser 9 hosted by a client 8 is connected to the front-end router 803. The front-end router 803 then distributes the requests among the web cache servers 802 in the cluster.

Upon receiving a request for a non-assigned-partition object 103, the front-end router 803 decides whether to forward it to the partition owner cluster 801 or to service it within its own cluster 801. In order to maximize the benefits of controlled caching of non-assigned-partition objects 103, the frontend router 803 should service only requests for a given object that exhibit reference locality, in other words, requests for a given object that occur closely enough together in time to justify devoting space in the cache to storing that given object. One approach to identifying requests for such objects is to count the requests for a given non-assigned-partition object 103. Only when the reference count for a given non-assigned-partition object 103 exceeds a threshold does the front-end router 803 decide to service requests for that object locally in its own cluster 801. Otherwise, the request will be forwarded to the cluster 801 corresponding to the requested object.

Figure 10:
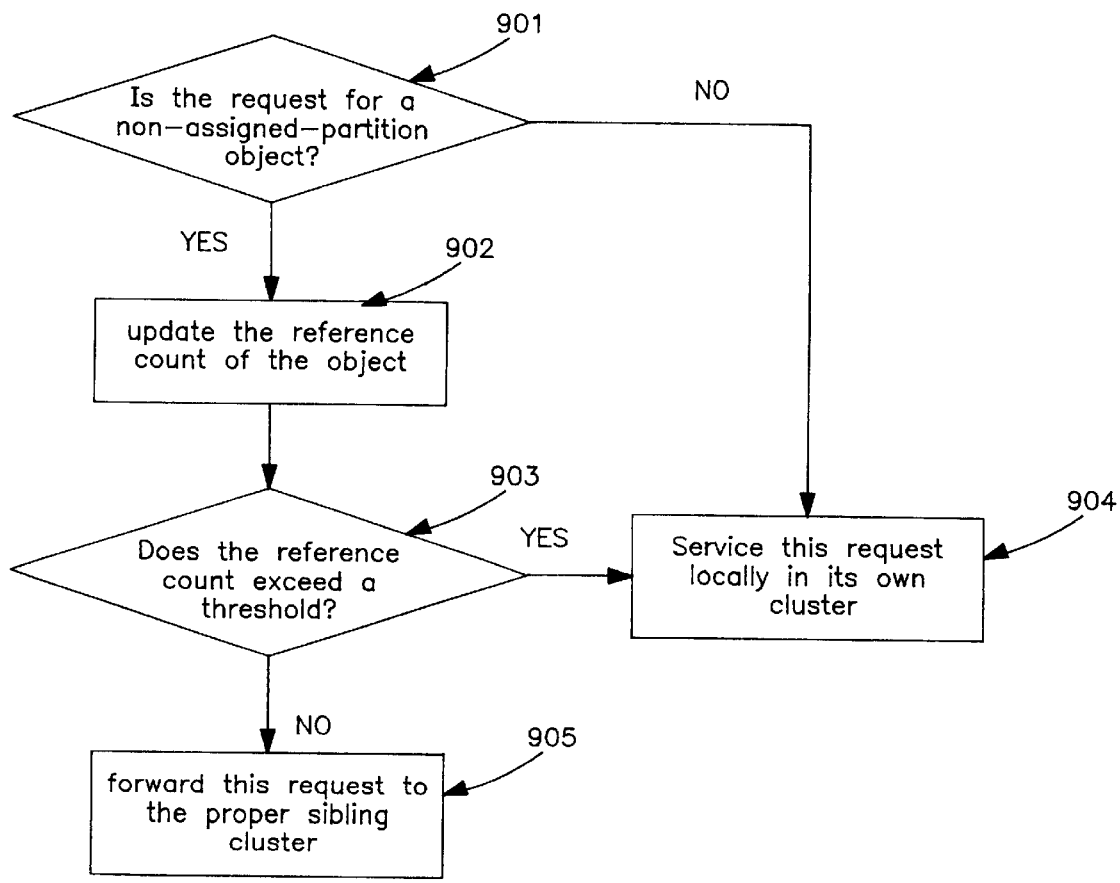
FIG. 10 is a flow chart of exemplary steps taken by a front-end router of a cluster of cache servers to decide if the request should be serviced locally in its own cluster.

FIG. 10 shows the flow diagram of steps taken by the front-end router 803 to decide if the request should be serviced locally in its own cluster 801. In block 901, it first checks to see if the requested object belongs to a non-assigned-partition. If yes, block 902, it updates the reference count of the requested object, and then checks if the reference count exceeds a threshold, block 903. If yes, the front-end router 803 will service this request locally in its own cluster 801. If not, block 905, then it will be forwarded to the proper sibling cluster. If the requested object belongs to the partition, then the request is serviced locally as well.

The invention also supports caching of web objects requested by hand-held (i.e., portable) devices (such as Palm Pilot) or other low-end devices, which typically have limited cache capacity on-board the device. Such hand-held devices may be serviced by a given web cache server 4. Users of such devices typically request new copies of web objects from the web cache server 4 more frequently than users of higher-end devices because of the relatively limited cache capacity of such hand-held devices. Specifically, web objects stored in such hand-held devices are overwritten more quickly in the limited caches provided by such low-end devices.

It is desirable to avoid having repeatedly to retrieve web objects requested by low-end or hand-held devices from the originating web server 1. To achieve this end, the proxy server module 5 aboard the web cache server 4 can be configured to identify requests for web objects from such devices, and to manage such web objects differently once they are cached. In an exemplary embodiment, the proxy server module 5 encodes requests from hand-held devices with meta information in the message header corresponding to such requests. When the requested web object is received and cached, the meta information is associated with that web object, thereby identifying that web object as having been requested by a hand-held device.

During subsequent cache management operations, this meta information alerts the web cache server 4 to use a different cache management policy for web objects requested by hand-held devices. Specifically, the different cache management policy allows objects requested by hand-held devices to remain longer in the cache than other web objects. Exemplary methods for managing web objects requested and referenced by hand-held devices are discussed below. In this manner, web objects originally requested by hand-held devices are available to satisfy future requests from hand-held devices.

Figure 11:
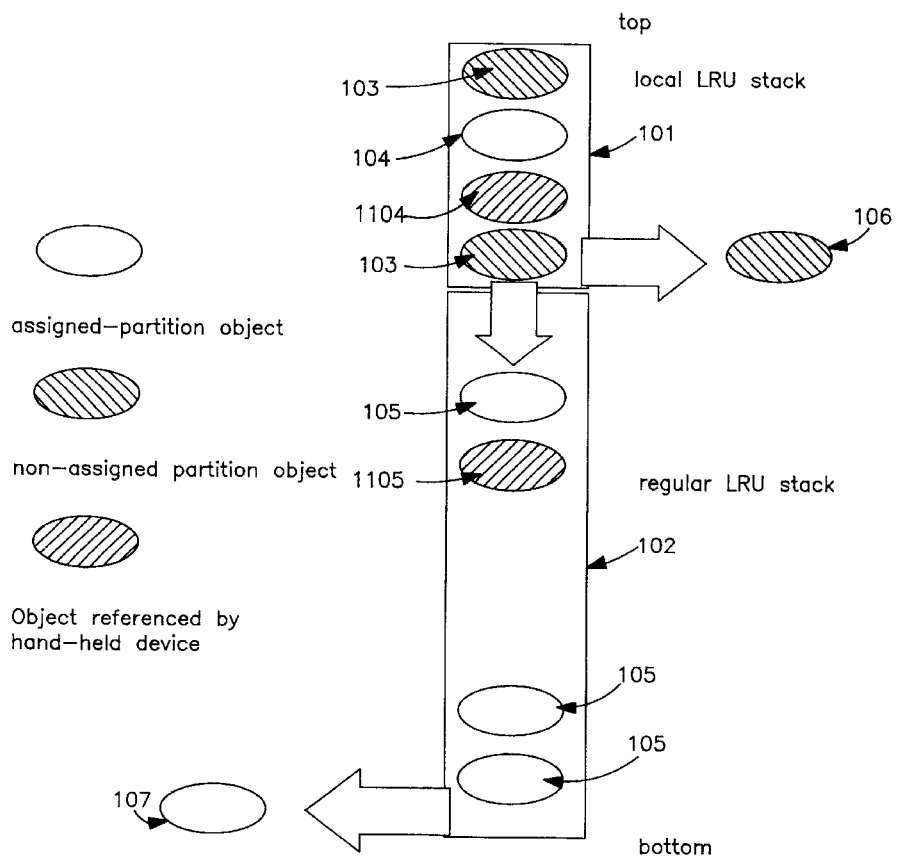
FIG. 11 is a diagram illustrating the movement of objects in a cache data structure that supports web objects referenced by hand-held devices.

FIG. 11 is a diagram of a cache data structure that allows web objects referenced by hand-held devices to stay in the entire cache. Reference numbers identical to those in FIG. 2 denote identical structure. When a non-assigned partition object 103 is to be pushed out of the local stack 101, if it is also referenced by a hand-held device, a copy of it is pushed onto the top of the regular stack 102. For example, object 1104 is illustrated as an object requested by a hand-held device. However, the object 1104 could also be classified as either an assigned partition object or a non-assigned partition object. The object 1105 represents the object 1104 after it is pushed onto the regular stack 102. Thus, both assigned-partition objects 104 and objects 1104 and 1105 referenced by hand-held devices can stay in the entire cache, as defined by the local stack 101 and the regular stack 102. Non-assigned partition objects 103 that are not referenced by hand-held devices stay only in the local stack 101.

In another exemplary method for supporting web objects requested by hand-held or other low-end devices, another threshold between the local stack 101 and the regular stack 102 is defined for the purposes of supporting objects 1104 and 1105 referenced by hand-held objects. This additional threshold is similar to threshold separating the local stack 101 from the regular stack 102 for the purposes of managing assigned-partition objects 104 and non-assigned partition objects 103. However, this additional threshold separates objects 1104 and 1105 that are referenced by hand-held devices from those objects that are not referenced by hand-held devices. Thus, the cache is conceptually divided into a hand-held stack and a non-hand-held stack. Objects 1104 and 1105 that are referenced by hand-held devices can reside only within the hand-held stack, while objects not requested by hand-held devices can reside anywhere in the cache, in either stack. The size of the hand-held stack can be adjusted to provide optimal support for web objects requested by hand-held devices. For example, if the hand-held stack is co-extensive with the entire cache, then web objects requested by hand-held devices can reside anywhere in the cache.

In the exemplary embodiments described above, a stack structure is used. It is understood, however, that the present invention is not limited to the stack structure described above. For example, an object may be removed from the cache using a value function. The value function may be based upon the number of times of access to the cache since the last reference to a particular one of the objects. The value function can also be based on the number of times of access to the cache since the last reference to a particular object divided by the size of the object. Thus, objects can be removed from the cache using a value function in which size is a factor. Alternately, as described above, the value function can be based upon cache accesses. Furthermore, a value is assigned to each object and objects are ordered in, for example, a stack according to the assigned values.

Although illustrated and described herein with reference to certain exemplary embodiments, the present invention is nevertheless not intended to be limited to the details shown. Rather, various modifications may be made in the details within the scope and range of equivalents of the claims and without departing from the spirit of the invention.

What is claimed:

1. A method for caching a plurality of web objects, wherein one of said objects is written an assigned web partition and another of said objects is outside of said assigned web partition, said method comprising the steps of:

placing said one of said objects in a first amount of space of a cache, wherein said first amount of space is in the form of a stack and a further stack;

placing said another of said objects in a second amount of space of said cache, wherein said second amount of space is in the form of said stack, wherein said first amount of space includes and is larger than said second amount of space;

moving said one of said object down said stack as any of said objects is pushed onto said stack;

maintaining said one of said objects in said cache as long as said one of said objects is said stack;

moving said one of said objects maintained in said cache to the top of said stack responsive to said one of said objects being accessed;

moving said one of said objects from the bottom of said stack to the top of said further stack as any of said objects is pushed onto the top of said stack;

maintaining said one of said objects in said cache as long as said one of said objects in said further stack;

wherein said one of said objects and said another objects are each pushed onto said stack.

2. A method for caching a plurality of web objects according to claim 1, wherein said one of said objects is removed from said cache using a value function.

3. A method for caching a plurality of web objects according to 2, wherein said value function is based upon times of access to said cache since the last reference to said one of said objects.

4. A method for caching a plurality of web objects according to claim 2, wherein said value function is a least-recently-used (LRU) algorithm.

5. A method for caching a plurality of web objects according to claim 1, wherein said another of said objects is removed from said cache using a value function.

6. A method for caching a plurality of web objects according to 5, wherein said value function is based upon times of access to said cache since the last reference to said another of said objects.

7. A method for caching a plurality of web objects according to claim 5, wherein said value function is a least-recently-used (LRU) algorithm.

8. A method for caching a plurality of web objects according to claim 2, wherein said one of said objects is situated within said stack and said further stack in accordance with said value function.

9. A method for caching a plurality of web objects according to claim 1, further comprising the steps of:
    moving said another of said object down a stack as any of said objects are pushed onto said stack;
    maintaining said another of said object in said cache as long as said another of said objects is in said stack;
    moving said another of said object maintained in said cache to the top of said stack responsive to said another of said objects being accessed; and
    discarding said another of said objects if said another of said object is at the bottom of said stack and any of said objects are pushed onto the top of said stack.

10. A method for caching a plurality of web objects according to claim 1, further comprising the step of:
    moving said object from said further stack to the top of said stack responsive to said object being accessed.

11. A method for caching a plurality of web objects according to claim 1, further comprising the step of:
    discarding said object if said object is at the bottom of said further stack and any of said objects is pushed onto said further stack.

12. A method for caching a plurality of web objects according to claim 1, further comprising the step of transferring any of said objects from said cache to a hand-held device.

13. A cache for a plurality of web objects, wherein one of said objects is within an assigned web partition and another of said objects is outside of said assigned web partition, comprising:
    a first amount of space in said cache for placement of said one of said objects, wherein said first amount of space is in the form of a stack; and
    a second amount of space in said cache for placement of said another of said objects, wherein said second amount of space is in the form of said stack;
    wherein said first amount of space includes and is larger than said second amount of space;
    wherein said first amount of space includes and is larger than said second amount of space;
    wherein said object is maintained in said cache as long as said object is in one of said stack and said further stack, and wherein said objects is recievable to said further stack from said stack.

14. A cache according to claim 13, wherein said one of said objects and said another of said objects are pushed onto said stack.

15. A cache according to claim 13, wherein said another of said objects is deleted from said cache when said another of said objects is removed from said stack.

16. A cache according to claim 13, wherein ones of said objects are referenced by a hand-held device.

17. An article of manufacture comprising a computer useable medium having computer readable program code means embodied therein for caching a plurality of web objects, wherein one of said objects is within an assigned web partition and another of said object is outside of said assigned web partition, the computer readable program code means in said article of manufacturer comprising computer readable program code means for causing a computer to effect;
    placing said one of said objects in a first amount of space of a cache, wherein said first amount of space is in the form of a stack and a further stack;
    placing said another of said objects in a second amount of space of said cache, wherein said second amount of space is in the form of said stack;
    wherein said first amount of said space includes and is larger than second amount of space;
    moving said one of said objects down said stack as any of said objects is pushed onto said stack;
    maintaining said one of said objects in said cache as long as said one of said objects is in said stack;
    moving said one of said objects maintained in said cache to the top of said stack responsive to said one of said objects being accessed;
    moving said one of said objects from the bottom of said stack to the top of said further stack as any of said objects is pushed onto the top of said stack;
    maintaining said one of said objects in said cache as long as said one of said objects is in said further stack;
    wherein said one of said objects and said another of objects are pushed onto said stack.

18. An article of manufacturer as recited in claim 17, the computer readable program code means in said article of manufacturer further comprising computer readable program code means for causing a computer to effect:
    removing said one of said objects from said cache using a value function.

19. An article of manufacturer as recited in claim 17, the computer readable program code means in said article of manufacturer further comprising computer readable program code means for causing a computer to effect:
    removing said another of said objects from said cache using a value function.

20. A computer program product comprising a computer useable medium having computer readable program code means embodied therein for causing caching of a plurality of web objects, wherein one of said objects is within an assigned web partition and another of said objects is outside of said assigned web partition, computer readable program code means in said computer program product comprising computer readable program code means for causing a computer to effect;
    placing said one of said objects in a first amount of space of a cache, wherein said first amount of space is in the form of a stack and a further stack;
    placing said another of said objects in a second amount of space of said cache, wherein said second amount of space is in the form of said stack;
    wherein said first amount of space includes and is larger than said second amount of space;

moving said one of said objects down said stack as any of said objects is pushed onto said stack;

maintaining said one of said objects in said cache as long as said one of said objects is in said stack;

moving said one of said objects maintained in said cache to the top of said stack responsive to said one of said objects being accessed;

moving said one of said objects from the bottom of said stack to the top of said further stack as any of said objects is pushed onto the top of said stack;

maintaining said one of said objects in said cache as long as said one of said objects is in said further stack;

wherein said one of said objects and said another of objects are each pushed onto said stack.

21. A program storage device readable by machine, tangibly embodying a program of instructions executable by the machine to perform method steps for caching a plurality of web objects, wherein one of said objects is within an assigned web partition and another of said objects is outside of said assigned web partition, said method comprising the steps of:

placing said one of said objects in a first amount of space of a cache, wherein said first amount of space is in the form of a stack and a further stack;

placing said another of said objects in a second amount of space of said cache, wherein said second amount of space is in the form of said stack;

wherein said first amount of space includes and is larger than said second amount of space;

moving said one of said objects down said stack as any of said objects is pushed onto said stack;

maintaining said one of said objects in said cache as long as said one of said objects is in said stack;

moving said one of said objects maintained in said cache to the top of said stack responsive to said one of said objects being accessed;

moving said one of said objects from the bottom of said stack to the top of said further stack as any of said objects is pushed onto the top of said stack;

maintaining said one of said objects in said cache as long as said one of said objects is in said further stack;

wherein said one of said objects and said another of objects are each pushed onto said stack.

* * * * *